US012659351B2

(12) United States Patent
Ramachandran et al.

(10) Patent No.: US 12,659,351 B2
(45) Date of Patent: Jun. 16, 2026

(54) SECURE NETWORK COMMUNICATION SYSTEM AND METHOD

(71) Applicant: ELISITY, INC., San Jose, CA (US)

(72) Inventors: Milan Ramachandran, Bangalore (IN); Piotr Kupisiewicz, Cracow (PL); Sarath Chandra Bysani, Bangalore (IN); Rajesh M, Bangalore (IN); Shailendra Hullur, Bangalore (IN)

(73) Assignee: ELISITY, INC., San Jose, CA (US)

( * ) Notice: Subject to any disclaimer, the term of this patent is extended or adjusted under 35 U.S.C. 154(b) by 163 days.

(21) Appl. No.: 18/427,660

(22) Filed: Jan. 30, 2024

(65) Prior Publication Data

US 2025/0106258 A1     Mar. 27, 2025

Related U.S. Application Data

(60) Provisional application No. 63/539,971, filed on Sep. 22, 2023.

(51) Int. Cl.
H04L 9/40          (2022.01)
(52) U.S. Cl.
CPC ............ H04L 63/20 (2013.01); H04L 63/107 (2013.01)

(58) Field of Classification Search
CPC .............................. H04L 63/20; H04L 63/107
USPC ............................................................. 726/1
See application file for complete search history.

(56) References Cited

U.S. PATENT DOCUMENTS

| | | | | |
|---|---|---|---|---|
| 9,935,885 B1 * | 4/2018 | Shen | ....................... | H04L 45/64 |
| 12,413,626 B2 * | 9/2025 | Balmakhtar | ........ | H04L 41/0894 |
| 2024/0179070 A1 * | 5/2024 | Zhou | ....................... | H04L 41/40 |
| 2024/0283825 A1 * | 8/2024 | Balmakhtar | ............ | H04L 63/20 |

FOREIGN PATENT DOCUMENTS

CN           119232643 A  * 12/2024  ........... H04L 45/021

\* cited by examiner

*Primary Examiner* — Aubrey H Wyszynski
(74) *Attorney, Agent, or Firm* — Maschoff Brennan

(57) ABSTRACT

A method for securing a network is described. The method includes receiving, by a virtual-edge (VE) docker of the network, a flow-tuple including data associated with at least a source device of the network, from an Internet Protocol (IP) flow cache. The method further includes performing, by the VE docker, a policy lookup for the flow-tuple in policy for the source device. The method furthermore includes pushing, by the VE docker, a transformed network access control (NAC) including NAC constructs based on the policy lookup, to an enforcement point (EP) in proximity to the source device.

20 Claims, 9 Drawing Sheets

400

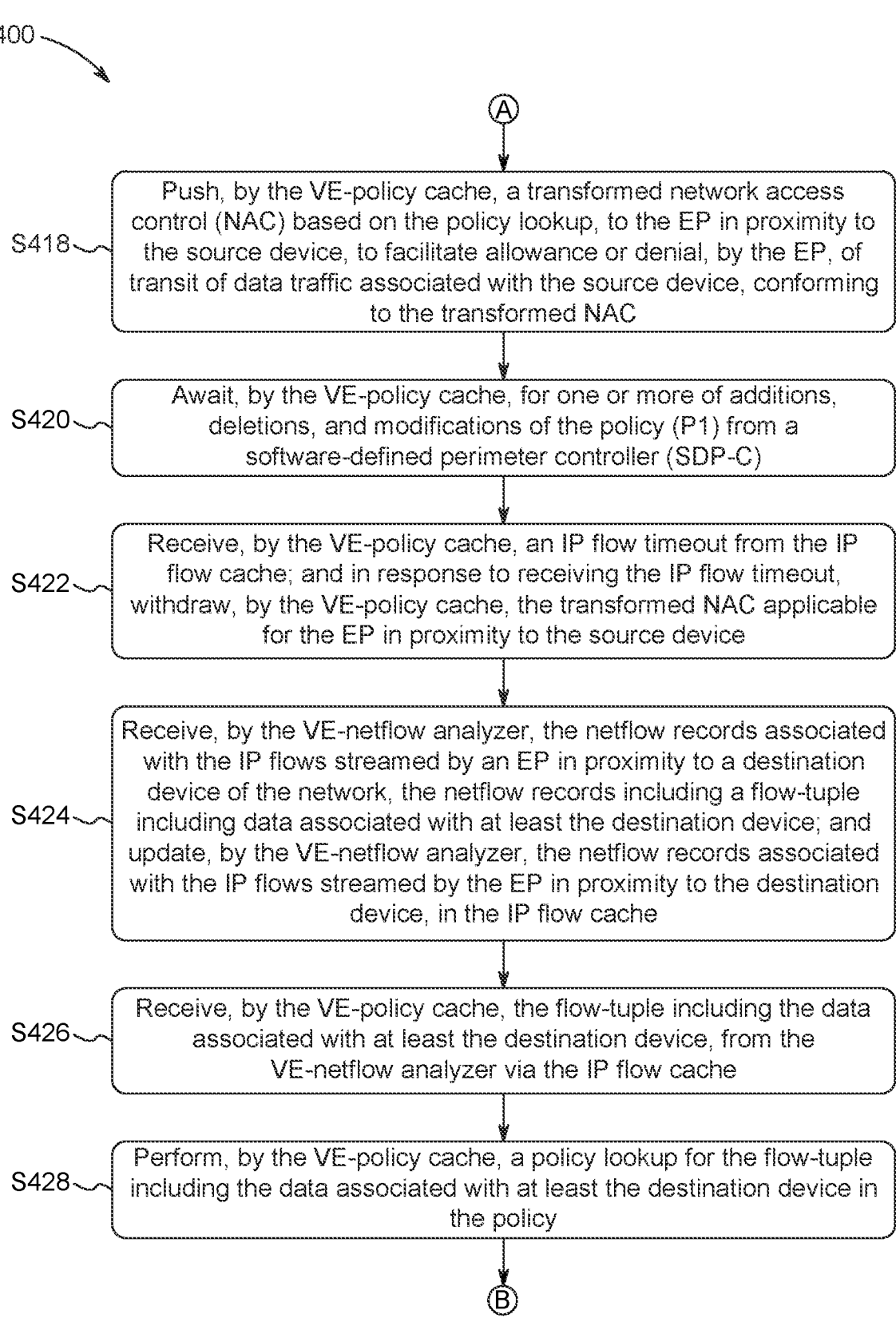

Ⓐ

S418 — Push, by the VE-policy cache, a transformed network access control (NAC) based on the policy lookup, to the EP in proximity to the source device, to facilitate allowance or denial, by the EP, of transit of data traffic associated with the source device, conforming to the transformed NAC S420 — Await, by the VE-policy cache, for one or more of additions, deletions, and modifications of the policy (P1) from a software-defined perimeter controller (SDP-C)

S422 — Receive, by the VE-policy cache, an IP flow timeout from the IP flow cache; and in response to receiving the IP flow timeout, withdraw, by the VE-policy cache, the transformed NAC applicable for the EP in proximity to the source device S424 — Receive, by the VE-netflow analyzer, the netflow records associated with the IP flows streamed by an EP in proximity to a destination device of the network, the netflow records including a flow-tuple including data associated with at least the destination device; and update, by the VE-netflow analyzer, the netflow records associated with the IP flows streamed by the EP in proximity to the destination device, in the IP flow cache S426 — Receive, by the VE-policy cache, the flow-tuple including the data associated with at least the destination device, from the VE-netflow analyzer via the IP flow cache S428 — Perform, by the VE-policy cache, a policy lookup for the flow-tuple including the data associated with at least the destination device in the policy

SECURE NETWORK COMMUNICATION SYSTEM AND METHOD

RELATED APPLICATION(S)

This application claims priority under 35 U.S.C. § 119(e) of U.S. Provisional Patent Application Ser. No. 63/539,971, filed Sep. 22, 2023, and titled "SECURE NETWORK COMMUNICATION SYSTEM AND METHOD" which is hereby incorporated by reference in its entirety.

FIELD OF THE INVENTION

The embodiments discussed in the present disclosure are generally related to providing secure communication in networks. In particular, the embodiments discussed are related to providing secure communication based on a zero-trust security mechanism and by implementation of traffic triggered, policy-based enforcement (TTP-based enforcement) for scalability and minimum latency.

BACKGROUND OF THE INVENTION

Conventionally, a software-defined perimeter (SDP) system is operable to secure a network of devices in one or more enterprise networks by combining device authentication, access based on verified identity, and connections that are provisioned dynamically as needed. The SDP system may include an SDP controller (SDP-C) that functions as, or interfaces with, a certificate authority and authenticator (in an example, an operator of the SDP system) to manage various connections between devices seeking to communicate with each other. Source devices seeking to access destination devices in the SDP are required to interface with an SDP gateway device for communication. The SDP gateway device may, for instance, include at least switches and routers.

Further, in the context of SDP, SDP gateway devices (i.e., switches and routers) may typically be referred to as "enforcement points (EPs)" or "enforcement devices (EDs)". The SDP gateway devices implement the security policies and access controls defined by the SDP system or the operator.

In a remote working model, a distributed enterprise with its assets spread around multiple disparate and geographically separate domains, presents a large attack surface for a third-party attack. Conventional zero-trust security mechanisms, especially those, that use network-based segmentation, include identification of devices and users, preferably at the edge of a network (in an example, at EPs in the network) defined by SDP. The SDP-C (in an example, a cloud or campus-based SDP controller) may program policies on EPs thereby facilitating isolation between protected resources (in an example, servers in the SDP system), and devices or users.

Further, the policies defined at the EPs (hosting devices or users, and protected resources) depend on the level of device or user authentication. In other words, depending on the level of device or user authentication, the SDP-C may dynamically adapt and reconfigure policies on the EPs. Further, the EPs may inspect traffic traversing the network defined by SDP, and send netflow records that describe metadata of the inspected traffic to one or more entities in the SDP system. Furthermore, the EPs filter the traffic traversing the network using network access control (NAC) lists, or any other vendor proprietary methods.

However, conventional zero-trust security mechanisms do not facilitate secure communication using a scalable approach with minimal latency, and efficient utilization of the EP hardware resources. Therefore, there is a need to provide a secure network communication system that overcomes at least the challenges mentioned above.

SUMMARY OF THE INVENTION

Embodiments of a secure network communication system and a corresponding method are disclosed that address at least some of the above challenges and issues.

In a first aspect of the invention, a method for securing a network is described. The method includes receiving, by a virtual-edge (VE) docker of the network, a flow-tuple including data associated with at least a source device of the network, from an Internet Protocol (IP) flow cache. The method further includes performing, by the VE docker, a policy lookup for the flow-tuple in policy for the source device. The method furthermore includes pushing, by the VE docker, a transformed network access control (NAC) including NAC constructs based on the policy lookup, to an EP in proximity to the source device. Pushing the transformed NAC facilitates allowance or denial, by the EP, of transit of data traffic associated with the source device, conforming to the transformed NAC.

In a second aspect of the invention, a VE docker for securing a network is described. The system includes a processor; and a memory storing computer-executable instructions that when executed, cause the processor to: receive, a flow-tuple including data associated with at least a source device of the network, from an IP flow cache; perform a policy lookup for the flow-tuple in policy for the source device; and push a transformed NAC including NAC constructs based on the policy lookup, to an EP in proximity to the source device. Pushing the transformed NAC facilitates allowance or denial, by the EP, of transit of data traffic associated with the source device, conforming to the transformed NAC.

The present disclosure provides several objects and advantages, some of which are discussed below. The present disclosure enables policy on demand (also referred to as Just in Time policy (JITP)). Further, the present disclosure improves policy scale on SDP systems that use hardware Ternary Content Addressable Memory (TCAM) based EPs. Furthermore, since a proposed VE docker is located often close to the EPs, there is no round trip transit and processing at the SDP-C in the cloud. Additionally, the proposed VE docker is controlled by an SDP-C, and has the following functionalities:
(i) Discovers EPs and reports them to the SDP-C,
(ii) Acts on behalf of the SDP-C for policy enforcement functions, and pushes policies to the EPs, and
iii) Collects metadata from the EPs, which is relevant to the identification of enterprise users and devices.

Additionally, the functionalities offered by the proposed VE docker minimizes the policy enforcement latency, preventing any attack surfaces, that may be exposed for a short duration of time, in current SDP systems.

Further, the present disclosure achieves the above objects and advantages by having a policy enforcement cache (PEC) on the VE docker. The PEC is a cache memory, including the directions required to program the policies for devices (source and/or destination devices). Further, when an SDP-C pushes policy (P1), the policy lands in the PEC first. The policy (P1) is not immediately programmed by the VE docker to the targeted EP. Further, the VE docker enables netflow (associated with IP flows) on the EPs, and also functions as the netflow collector. Further, the VE docker performs netflow analytics on the VE docker, to detect relevant IP flow tuples which are the source, destination IP pairs. In an embodiment, the VE docker makes a computation by consulting the PEC, on whether a policy needs to be pushed, towards the EPs. Further, the VE docker withdraws previous policy pushes from the EPs, when an IP flow is marked stale, after a timeout, since the last packet (of an IP flow) is seen. Further, pre-emptive push of the policies is enabled. In an embodiment, if there is a pattern of communication, between two IP endpoints (IPEs), at a certain time of day, the present disclosure facilitates pushing the policies in advanced anticipation, and withdraw them, after the expected IP flows are stale.

BRIEF DESCRIPTION OF THE DRAWINGS

Further advantages of the invention will become apparent by reference to the detailed description of preferred embodiments when considered in conjunction with the drawings:

FIGS. 4A-4C illustrate a flowchart illustrating the steps involved in securing a network using TTP-based enforcement, in accordance with some embodiments.

DETAILED DESCRIPTION

Figure 1:
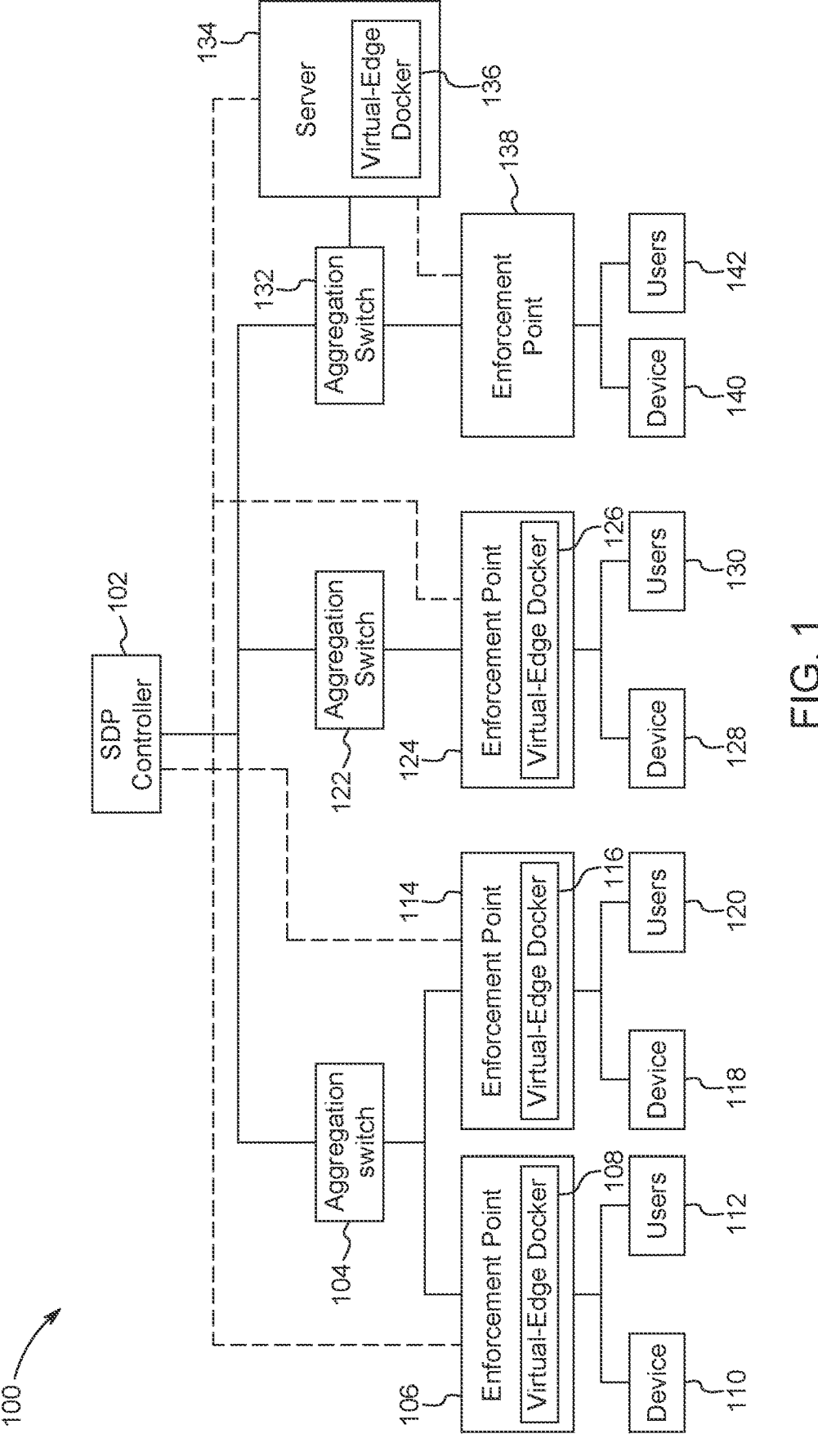
FIG. 1 illustrates a network for implementing secure communication, in accordance with some embodiments.

The following detailed description is presented to enable any person skilled in the art to make and use the invention. For purposes of explanation, specific details are set forth to provide a thorough understanding of the present invention. However, it will be apparent to one skilled in the art that these specific details are not required to practice the invention. Descriptions of specific applications are provided only as representative examples. Various modifications to the preferred embodiments will be readily apparent to one skilled in the art, and the general principles defined herein may be applied to other embodiments and applications without departing from the scope of the invention. The present invention is not intended to be limited to the embodiments shown but is to be accorded the widest possible scope consistent with the principles and features disclosed herein.

Certain terms and phrases have been used throughout the disclosure and will have the following meanings in the context of the ongoing disclosure.

A "network" may refer to a series of devices or network elements that are interconnected via communication paths. The network may include any number of software and/or hardware elements coupled to each other to establish the communication paths and route data via the established communication paths.

An "enterprise network" may refer to a network owned, leased, and/or managed by customers, which may include one or more business entities. By way of an example, the enterprise network may refer to internal network infrastructure employed by an enterprise or organization to provide connectivity among users, devices, and applications that are local to the enterprise. Therefore, an enterprise network may include one or more internal networks that are located at geographically separate sites.

An "aggregation switch" may refer to a networking device that allows multiple network connections to be bundled together into a single link, and thus enabling increased bandwidth and better network performance.

A "software-defined perimeter (SDP)" may refer to a logical or software-based perimeter around one or more enterprise networks that may provide services to connect the enterprise networks or their internal networks with each other. The SDP may form a virtual boundary around the enterprise network(s) to restrict access to the enterprise network(s).

An "SDP controller (SDP-C)" may refer to a cloud-based logical component of the SDP that determines devices in the enterprise network, which are allowed to connect to each other. The SDP-C may be configured to perform functions such as, but not limited to, policy enforcement, authentication of SDP hosts (i.e., SDP gateway devices) such as EPs, determining EPs that may communicate with each other, and implementing corrective actions to ensure that an enterprise network is secure.

A network includes one or more EPs, and source and destination devices. An EP assigned to a source device (IP-E) is deployed on or in vicinity of the source device that intends to access an application(s), or a service(s), or at least one functionality associated with a destination device (or a destination network). For example, the applications or services or functionalities may be one or more of, but not limited to, a Software-as-a-Service (SaaS) application, a public cloud-based application, a data center-based storage service, and an Internet of Things (IoT) application. Further, the EP assigned to the source device enforces policies on the source device. In one embodiment, the EP assigned to the source device may include switches and routers, which are deployed on or in vicinity of the source device. In another embodiment, the EP assigned to the source device may also include a software application on the source device to implement the above-described functions.

An EP assigned to a destination device (IP-E) is deployed as a guard to protect the service or application or functionality associated with the destination device that the source device intends to access. The EP assigned to the destination device allows access to the application or service or functionality to only those source device associated EPs that are authorized by the SDP-C. The EP assigned to the destination device acts as the closest policy EP to the destination device for enforcing policies on the destination device. Thus, the EP in proximity to the destination device acts as closest EP. In one embodiment, an EP assigned to the source device may include switches and routers, which are deployed on or in vicinity of the destination device. In another embodiment, the EP assigned to the destination device may also include a software application on the destination device to implement the above-described functions.

A "virtual-edge (VE) docker" may be hosted at a switch in an SDP network or on any enterprise Hypervisor, and may be a docker container-based implementation of a trust software running on a switch or on any enterprise Hypervisor by leveraging the switch's or enterprise's integrated application hosting functionality.

A "zero-trust" security mechanism may refer to a security mechanism employed in the enterprise network, in which no user or device is considered trustworthy by default to access an enterprise network. Each user or device is required to mandatorily verify an associated identity before connecting to another device, application, or service in the enterprise network.

A "data packet" may refer to data or information that is packaged for transmission over a network. The data packet may include a payload portion, a metadata portion, and one or more headers. In one example, the headers may include one or more of, but not limited to, an inner internet protocol (IP) header and an outer IP header. The payload portion may include data (e.g., customer-related data) that the source device may intend to transmit to the destination device. Such data included in the payload portion may be sensitive and/or confidential and may need to be protected from any attack or impersonation by external or suspicious parties. Further, the term "data" refers to any type of information, such as but not limited to messages, voice, video, media, or any other information in any appropriate format that may be communicated from one point to another. Further, a "data packet" may be referred to as an "IP packet", interchangeably.

The embodiments of the methods and systems are described in more detail with reference to FIGS. 1-3 and 4A-4C.

FIG. 1 illustrates network 100, in accordance with some embodiments. Network 100 may be in communication with one or more enterprise networks (not shown in FIG. 1) associated with one or more enterprises. In an embodiment, the network 100 may include an SDP-C 102; an aggregation switch 104; an EP 106 deployed on or in vicinity of a device 110 and users 112, and including a VE docker 108 in one embodiment; an EP 114 deployed on or in vicinity of a device 118 and users 120, and including a VE docker 116 in one embodiment; an aggregation switch 122; an EP 124 deployed on or in vicinity of a device 128 and users 130, and including a VE docker 126 in one embodiment; an aggregation switch 132; a server 134 including a VE docker 136; an EP 138 that cannot host a VE docker in one embodiment; a device 140; and users 142. As can be seen from FIG. 1, SDP-C 102 is positioned in the cloud and may enforce policies to various enterprise branch sites (including, but not limited to, EPs 106, 114, and 124, and to EP 138 through server 134 that hosts VE docker 136). In an embodiment, VE docker 108 may reside near EP 106, and device 110 may be a source device. In an embodiment, VE docker 116 may reside near EP 114, and device 118 may be a destination device that hosts one or more applications or services or has at least one functionality. In an embodiment, VE docker 126 may reside near EP 124, and device 128 may be a destination device that hosts one or more applications or services or has at least one functionality. In an embodiment, VE docker 136 may reside near EP 138 and/or server 134. In an embodiment, EPs 106, 114, and 124 are capable of hosting VE dockers, whereas EP 138 is incapable of hosting any VE docker. In an embodiment, server 134 is a virtual machine (VM) on Hypervisor, and by hosting VE docker 136, server 134 ensures that secure communication may be provided to device 140 and users 142. In an embodiment, device 140 may be a source device that intends to connect with one or more destination devices. In another embodiment, device 140 may be a destination device that hosts one or more applications or services or has at least one functionality.

Further, in an embodiment, EP 106 and the source device 110 may be associated with a first enterprise network, EP 114 and the destination device 118 may be associated with a second enterprise network, EP 124 and the destination device 128 may be associated with a third enterprise network, and EP 138 and the destination device 140 may be associated with a fourth enterprise network. In another embodiment, EP 106 and the source device 110 may be located at a first geographical site of an enterprise network, EP 114 and the destination device 118 may be located at a second geographical site of the same enterprise network, EP 124 and the destination device 128 may be located at a third geographical site of the same enterprise network, and EP 138 and the destination device 140 may be located at a fourth geographical site of the same enterprise network. Further, in an embodiment, the source device 110 may intend to connect and communicate with more than one destination device (in an example, the source device 110 may intend to connect and communicate with the destination devices 118, 128, and 140).

Further, in an embodiment, a VE docker (in an example, VE docker 108) resides near a group of EPs (in an example, the group of EPs includes EP 106), and controls a single EP (in an example, EP 106) or the group of EPs. In FIG. 1, only one VE docker is shown as an example to reside near its corresponding EP. There may be more than one VE docker residing near each EP. Further, there may be: a secure control channel (shown as dotted line in FIG. 1) between VE docker 108 and SDP-C 102 for facilitating communication between VE docker 108 and SDP-C 102, a secure control channel (shown as dotted line in FIG. 1) between VE docker 116 and SDP-C 102 for facilitating communication between VE docker 116 and SDP-C 102, a secure control channel (shown as dotted line in FIG. 1) between VE docker 126 and SDP-C 102 for facilitating communication between VE docker 126 and SDP-C 102, and a secure control channel (shown as dotted line in FIG. 1) between VE docker 136 and SDP-C 102 for facilitating communication between VE docker 136 and SDP-C 102. In an embodiment, a VE docker (in an example, VE docker 108) may transform SDP-C's policy enforcement language (PEL) to vendor specific NAC commands or configurations.

In an embodiment, a PEL is spoken to/from SDP-C 102 to a VE docker (in an example, VE docker 108), describing details of the policy (to be enforced) between two IPEs (in an example, between the source device 110 and the destination device 118). The PEL is equivalent to programming of IP NAC list rules on a corresponding EP. In an embodiment, the IP NAC list rules may include permitting or denying traffic between the two IPEs. There could be several approaches, which describe the policy contract between the two IPEs. Some example approaches include, but are not limited to: Protocol Buffers (protobuf), or JavaScript Object Notation (json), or yet another markup language (yaml), or any other SDP implementor proprietary. An example of a PEL associated with a yaml file that has a "segments" field, a "security_profile" section, and a "policies" section, in accordance with some embodiments, is detailed below:

```
segments:
    192.168.0.1: classifier1
    10.0.0.1: classifier2
    172.16.0.1: classifier3
security_profile:
    name: profile1
    rules:
        {srcport: 80, dstport: 8080, action: permit}
        {srcport: 443, dstport: 8080, action: deny}
    name: profile2
    rules:
        {srcport: 8080, dstport: 80, action: permit}
        {srcport: 22, dstport: 8080, action: deny}
        {srcport: 8080, dstport: 443, action: log}
    name: profile3
    rules:
```

```
{srcport: 22, dstport: 80, action: permit}
{srcport: 443, dstport: 8080, action: deny}
{srcport: 8080, dstport: 22, action: log}
policies:
    name: policy1
        SourceClassifier: classifier1
        DestinationClassifier: classifier2
        AccessControlDefinition: profile1
    name: policy2
        SourceClassifier: classifier2
        DestinationClassifier: classifier3
        AccessControlDefinition: profile2
    name: policy3
        SourceClassifier: classifier3
        DestinationClassifier: classifier1
        AccessControlDefinition: profile3.
```

In an embodiment, the yaml file may be associated with the PEL spoken to/from SDP-C 102 to a VE docker (in an example, VE docker 108). The "segments" field may describe the segmentation of different IPEs (including the devices 110, 118, 128, and 140) into appropriate classifiers. The "security_profile" section may list different NACs that can be applied to all IPEs in the network 100, and the "policies" section may describe the NACs that are applicable between any two segments of IPEs in the network 100.

In an embodiment, a VE docker (in an example, VE docker 108) may convert a PEL (in an example, the PEL described above) to vendor specific constructs (to describe the details of the policy), over a Network Configuration (Netconf), or a Representational State Transfer Configuration (Restconf) transport, or over command-line interface (CLI).

An example of a generic access control list (ACL) representation, for "policy1" in the PEL described above, in accordance with some embodiments, is detailed below:

```
EP 114(config) #ip access-list extended policy1
EP 114(config-ext-nacl) #permit tcp host 192.168.0.1 eq
    80 host 10.0.0.1 eq 8080
EP 114(config-ext-nacl) #deny tcp host 192.168.0.1 eq
    443 host 10.0.0.1 eq 8080
EP 114(config-ext-nacl) #exit
```

In an embodiment, a VE docker (in an example, VE docker 108) may obtain identity metadata from protocol sessions of data (in an example, IP flows) transiting an EP (in an example, EP 106) and detect Information Technology (IT)/Operational Technology (OT)/Internet of Things (IoT)/Internet of Medical Things (IoMT) devices/any other IPE. Thus, in such embodiment, EP 106 may be determined to be closest EP to said devices/any other IPE. Further, the obtained metadata is called an identity attach (IA) attributed to the associated EP (i.e., EP 106). The IA may then be sent to an SDP-C (in an example, SDP-C 102), where additional identity and policy classification is performed. In an embodiment, one or more policies may be distributed by SDP-C 102, to appropriate VE dockers (including VE docker 108) in network 100 which, in turn, are enforced using switch-native functionality on the EP (i.e., EP 106) closest to the IPE (in an example, the source device 110). In an embodiment, an EP (i.e., EP 106) in proximity to the IPE (in an example, the source device 110) may be defined as the closest EP to that IPE. Switch-native functionality refers to the NAC commands understood by the EP vendor for the application of policies to allow or deny IP flows between the IPEs in the network 100.

Further, an example of an IA, generated by a VE docker (in an example, VE docker 108), on detection of an IPE (in an example, the source device 110), in accordance with some embodiments, is detailed below:

```
Identity-attach:
    name: attach1
        type: device-attach
        mac: 00:03:22:45:56:43
        ip: 192.168.0.1
        eventtype: login
        eventtime: 7:00 PM UTC, 23 Jan. 2022
```

Further, when an IPE goes offline (i.e., when the IPE is no longer detected), there would be similar messages (as described above) generated, specifying a device going offline, called a "detach".

An SDP-C (in an example, SDP-C 102) has mechanisms in place to map device and user identities to appropriate segments (into which the different IPEs are classified). A VE docker (in an example, VE docker 108), when generating the IA may not be required to know the mechanics of the classification criteria (using which the different IPEs are classified into different segments). This classification is performed by an SDP-C (in an example, SDP-C 102). A VE docker (in an example, VE docker 108) may need to possess information on the final concrete and actionable application of the policy as described in the PEL (in an example, PEL described above).

Figure 2A:
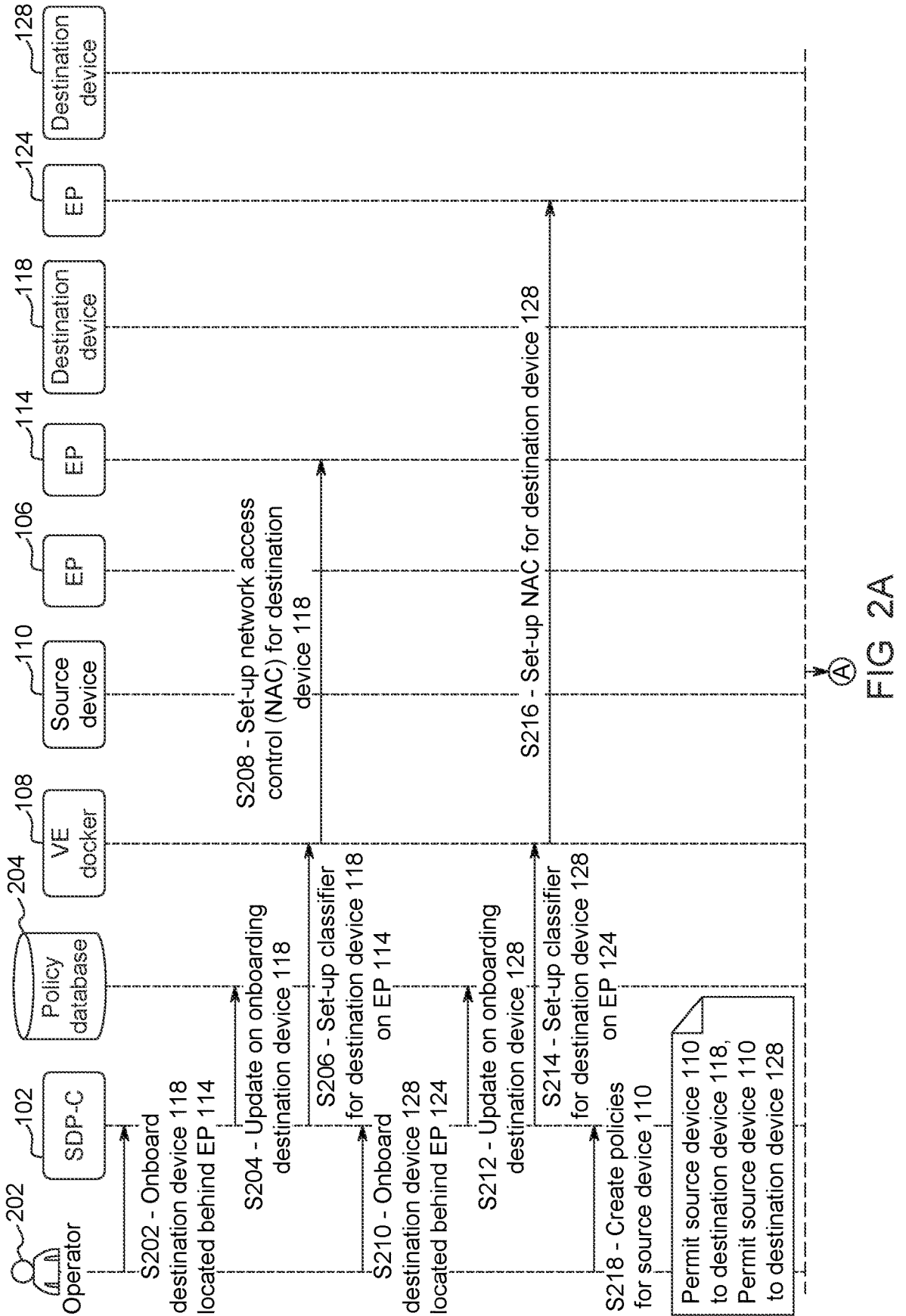
FIGS. 2A-2C illustrate a signal flow diagram to illustrate one known method for implementing a zero-trust security mechanism, in accordance with some embodiments.
Figure 2B:
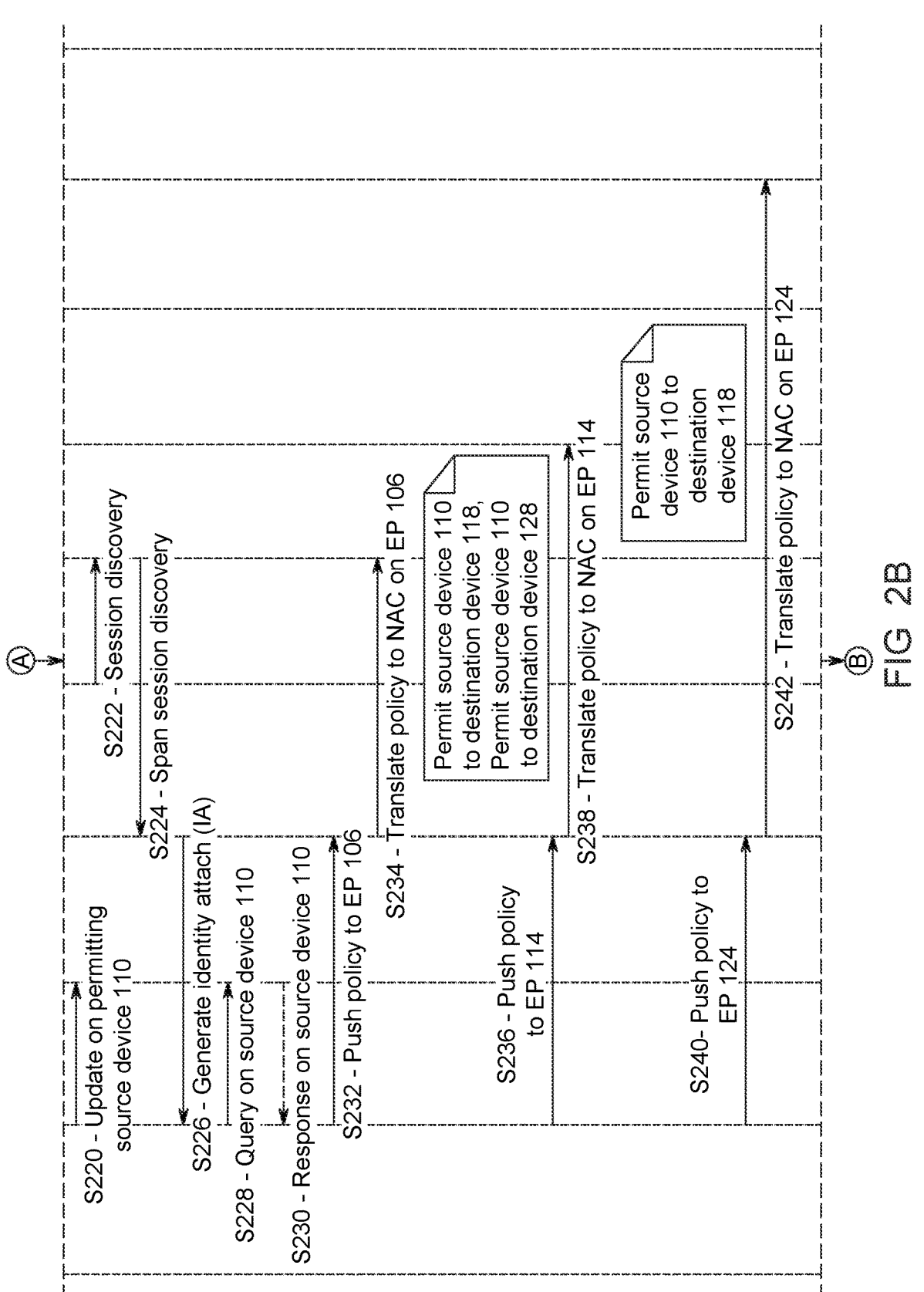
Figure 2C:
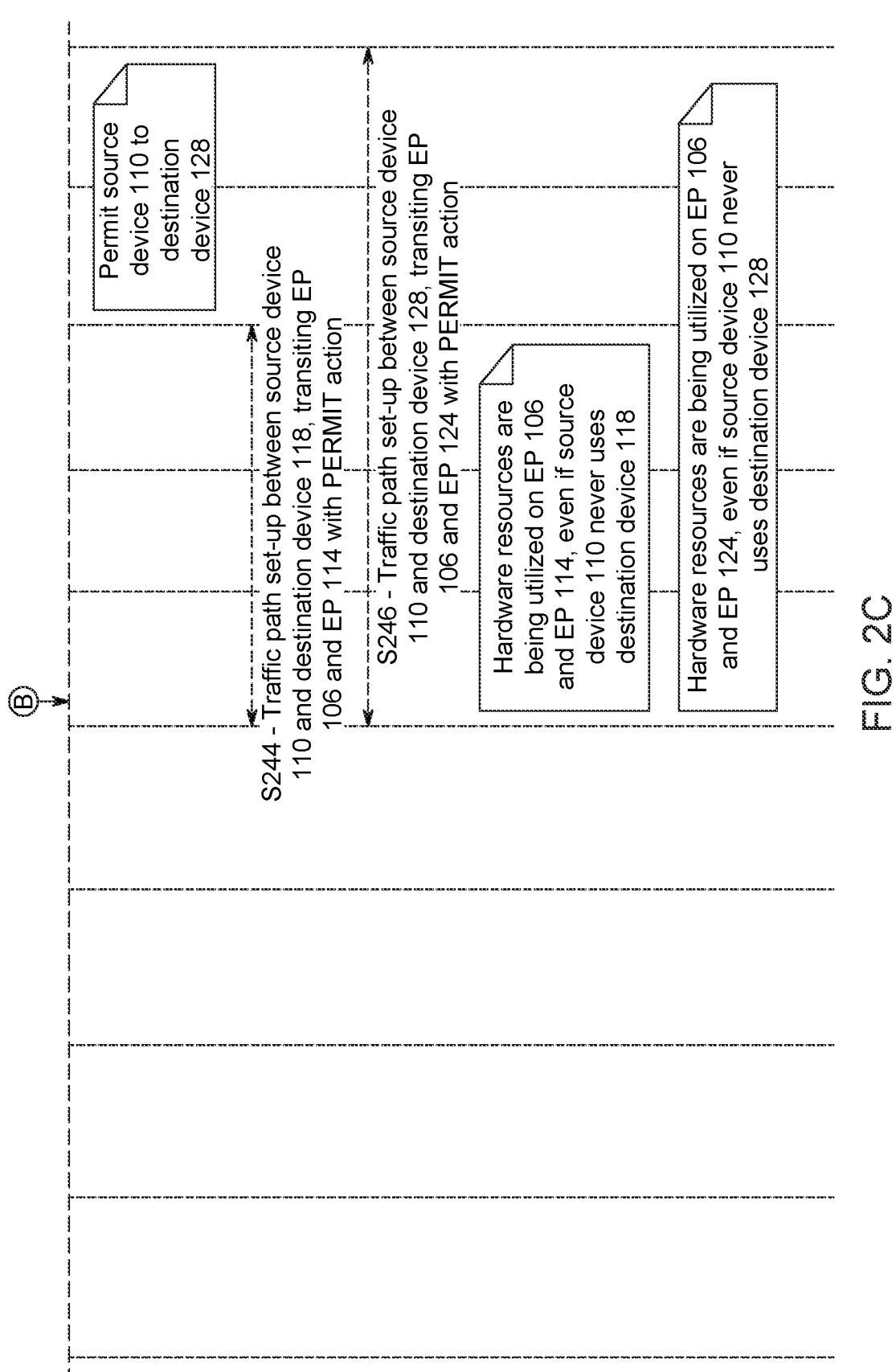

FIGS. 2A-2C illustrate a signal flow diagram to illustrate one known method for implementing a zero-trust security mechanism, in accordance with some embodiments. The signal flow diagram illustrates an example scenario, where an SDP system (for providing secure network communication between different IPEs) is set-up to allow the source device 110 (in an example, a laptop referred to as IPE1) that intends to use EP 106 to access the destination device 118 (in an example, a Jenkins server referred to as IPE2) located on EP 114, and the destination device 128 (in an example, a Postgres server referred to as IPE3) located on EP 124.

In step S202 of FIG. 2A, operator 202 may command the destination device 118 to be onboarded behind EP 114. In such a scenario, EP 114 may be considered as the closest EP to destination device 118 in view of the command by operator 202. Next, in step S204 of FIG. 2A, SDP-C 102 may update the policy database 204 (that stores one or more policies for one or more IPEs in the network 100) on onboarding destination device 118. Then, in steps S206 and S208 of FIG. 2A, SDP-C 102 and VE docker 108 may set-up NAC constructs (in an example, NAC lists) on EP 114, to classify traffic (in an example, IP flows) associated with the destination device 118. In an embodiment, a PEL (in an example, PEL described above) may be used between SDP-C 102 and VE docker 108, for the set-up of NAC constructs on EP 114.

Next, in step S210 of FIG. 2A, operator 202 may command the destination device 128 to be onboarded behind EP 124. In such a scenario, EP 124 may be considered as the closest EP to destination device 128 in view of the command by operator 202. Next, in step S212 of FIG. 2A, SDP-C 102 may update the policy database 204 on onboarding the destination device 128. Then, in steps S214 and S216 of FIG. 2A, SDP-C 102 and VE docker 108 may set-up NAC constructs (in an example, NAC lists) on EP 124, to classify traffic associated with the destination device 128. In an embodiment, a PEL (in an example, PEL described above) may be used between SDP-C 102 and VE docker 108, for the set-up of NAC constructs on EP 124.

Next, in step S218 of FIG. 2A, operator 202 may create one or more policies for the source device 110. In an embodiment, the created one or more policies may facilitate permitting source device 110 to access at least one application or service or functionality of the destination device 118, and further facilitate permitting the source device 110 to access at least one application or service or functionality of the destination device 128. Next, in step S220 of FIG. 2B, SDP-C 102 may update the policy database 204 on permitting the source device 110. Then, by means of steps S222 and S224 of FIG. 2B, VE docker 108 may use spanned session metadata obtained from the source device 110 (either from, for from all DHCP or Radius or Kerberos) for the source device identification (in an example, the source device 110 is identified to be a laptop). Subsequently, in step S226 of FIG. 2B, VE docker 108 may generate an IA, specifying addresses of the source device 110 and location on EP of the source device 110 (in an example, the tuple {laptop IP Address (source device 110), laptop MAC address, location (located on EP 106) is information that is specified}, to SDP-C 102.

In the next step S228 of FIG. 2B, SDP-C 102 may query the policy database 204 on the source device 110. In an embodiment, the query may be related to the update(s) provided by SDP-C 102 in one or more of steps S204, S212, and S220. Subsequently, in step S230 of FIG. 2B, the policy database 204 may provide the response on the source device 110 to SDP-C 102.

In an embodiment, steps S232-S246 of FIGS. 2B-2C may be based at least in part on policy computations performed by SDP-C 102. In particular, through steps S232 and S234 of FIG. 2B, SDP-C 102 may push policy (in an example, policy associated with a PEL (PEL1)), to VE docker 108, targeting EP 106, permitting traffic (in an example, IP flows) between the source device 110, and the destination device 118 (on EP 114) and the destination device 128 (on EP 124). Next, through steps S236 and S238 of FIG. 2B, SDP-C 102 may push policy (in an example, policy associated with a PEL (PEL2)), to VE docker 108, targeting EP 114, permitting traffic (in an example, IP flows) between the source device 110 and the destination device 118 (on EP 114). Subsequently, through steps S240 and S242 of FIG. 2B, SDP-C 102 may push policy (in an example, policy associated with a PEL (PEL3)), to VE docker 108, targeting EP 124, permitting traffic (in an example, IP flows) between the source device 110 and the destination device 128.

In step S244 of FIG. 2C, a traffic path may be set-up between the source device 110 and the destination device 118, transiting EPs 106 and 114, with permission for exchange of traffic (in an example, IP flows) between the source device 110 and the destination device 118. Next, in step S246 of FIG. 2C, a traffic path may be set-up between the source device 110 and the destination device 128, transiting EPs 106 and 124 with permission for exchange of traffic (in an example, IP flows) between the source device 110 and the destination device 128.

In the above scenario, wherein a conventional method for providing secure communication in a network is implemented, traffic paths (as discussed in steps S244 and S246) are set-up and hardware resources are consumed on EPs 106, 114, and 124, even if the source device 110 never accesses at least one of applications, services, or functionalities of the destination device 118 or of the destination device 128. Further, a conventional method similar to the method as discussed above (for policy enforcement) may be applicable in case of policy withdrawal (for the source device 110). To summarize, in the case of policy withdrawal, when VE docker 108 detects that the source device 110, is no longer visible on EP 106 or any other EP, VE docker 108 sends a device-detach IA message to SDP-C 102. Then, SDP-C 102 withdraws the set-up classifiers, and the created policies, for this scenario, releasing hardware resources on all EPs (i.e., EPs 106, 114, and 124).

Further, some of the constraints associated with the conventional method described above, are:

i). The first constraint is round-trip time. The round-trip time may include the delay faced by VE docker 108 to reach (in an example, connect with) SDP-C 102, a processing delay that occurs at SDP-C 102, time required to compute one or more policies for the source device 110, and time to obtain results associated with enforcement of the one or more policies for the source device 110. The round-trip time may lead to a possibility of potential policy enforcement issues during the assignment of one or more policies for the source device 110.

ii). In deployments, which do not use an overlay network similar to VXLAN, and a traffic path of one or more IP flows (for the source device 110) is say via three EPs, then there would be three IAs sent to SDP-C 102. This amplifies the point i) above, especially with respect to the time for processing that is required at SDP-C 102.

iii). EPs have a limited capacity of hardware-based enforcement, due to TCAM limitations at EPs. The maximum scale of policy-based enforcements in an SDP system, is limited by the hardware capacity of the least capable EP. The TCAM limitations are based at least on the least capable EP.

The constraints discussed above are non-limiting in nature. Further, some of the constraints in the conventional solutions (that are implemented to provide secure communication in networks) are explained by means of the following policy use case scenario. In this scenario, an SDP operator (in an example, operator 202) defines the following policies:

i). Permitting the source device 110 for a first protocol (in an example, secure shell (SSH) protocol) to the destination device 118, which is hosted behind EP 114.

ii). Denying the source device 110 for a second protocol (in an example, file transfer protocol (FTP)) to the destination device 128, which is hosted behind EP 124.

iii). Permitting the source device 110 for a third protocol (in an example, Telnet protocol) to a destination device (not shown in FIGS. 2A-2C), which is hosted behind an EP (not shown in FIGS. 2A-2C).

When the source device traffic (in an example, IP flow(s)) appears on EP 114, EP 114 forwards metadata (associated with the traffic of the source device 110) towards VE docker 108. VE docker 108 does an IA for the source device 110 to SDP-C 102. SDP-C 102 reconciles the IA with the configured policies (for the source device 110), and pushes them to VE docker 108. In an example, the policies that are pushed to VE docker 108, may be configured through one or more conventional algorithms that are known in the art. In an example, the policies (i.e., the configured policies) to be enforced on EP 114 may include:

i). Permitting the source device 110 for communicating using the first protocol with the destination device 118, ii). Blocking the destination device 118 from sending traffic using the first protocol towards the source device 110, iii). Blocking the source device 110 from sending traffic using the second protocol towards the destination device 128, iv) Blocking the destination device 128 from sending traffic using the second protocol on the source device 110, v). Permitting the source device 110 for communicating using the third protocol with the destination device (not shown in FIGS. 2A-2C), which is hosted behind the EP (not shown in FIGS. 2A-2C), and vi) Permitting the destination device (not shown in FIGS. 2A-2C), which is hosted behind the EP (not shown in FIGS. 2A-2C) for communicating using the third protocol with the source device 110.

Similarly, in an example, the policies (i.e., the configured policies) to be enforced on EP 124 may include:

i). Blocking the source device 110 from sending traffic using the second protocol towards the destination device 128, and ii). Blocking the destination device 128 from sending traffic using the first protocol towards the source device 110.

Similarly, in an example, the policies (i.e., the configured policies) to be enforced on the EP (not shown in FIGS. 2A-2C) may include:

i). Permitting the source device 110 for communicating using the third protocol with the destination device (not shown in FIGS. 2A-2C), which is hosted behind the EP (not shown in FIGS. 2A-2C), and ii). Permitting the destination device (not shown in FIGS. 2A-2C), which is hosted behind the EP (not shown in FIGS. 2A-2C), for communicating using the third protocol with the source device 110.

In an example, while all the above-described policies are pushed on EPs 114, 124, and on all other EPs, one or more of the pushed policies may not even be required. For instance, the source device 110 may never communicate with any destination device (the destination device 118, the destination device 128, or destination device (not shown in FIGS. 2A-2C) hosted behind the EP (not shown in FIGS. 2A-2C)) using the second protocol or the third protocol. Yet, SDP-C 102 and VE docker 108, may be forced to push the policies associated with the second and third protocols, to different EPs (EPs 114, 124, and all other EPs), as those are the policies specified by operator 202 of SDP-C 102. This scenario leads to entries in the hardware TCAMs (in EPs 114, 124, and all other EPs) which may never be used, and limits the policy scale, for the overall SDP system (since some of the memory at the EPs is blocked due to the entries which may never be used).

The present disclosure describes traffic triggered policies (TTP) which overcome the constraints associated with the method discussed by means of signal flow diagram of FIGS. 2A-2C. The present disclosure:

i). Proposes a policy enforcement cache (PEC) on a VE docker (in an example, VE docker 108). In an embodiment, a PEC is a cache memory that includes the directions required to program the policies for a source device (in an example, the source device 110).

ii). Ensures that when an SDP-C (in an example, the SDP-C 102) pushes one or more policies, the one or more policies land in the PEC first. The one or more policies are not immediately programmed by the VE docker to a targeted EP (in an example, EP 114, EP 124, or any other EP).

iii). Ensures that netflow, on the EPs, is enabled by the VE docker, and that the VE docker operates as the netflow collector. The netflow may include metadata of traffic (in an example, one or more IP flows) that transit the EPs.

iv). Proposes that netflow analytics be performed on the VE docker in order to detect relevant IP flow tuples which are the source, destination IP pairs (in an example, the source device 110 and the destination device 118, the source device 110 and the destination device 128, and the source device 110 and the destination device (not shown in FIGS. 2A-2C) hosted behind the EP (not shown in FIGS. 2A-2C)). The VE docker makes a computation by consulting the PEC, on whether a policy needs to be pushed towards the EPs.

V). Proposes that the VE docker withdraws previous policy pushes from the EPs, when an IP flow (transiting through the EPs) is marked stale, after a timeout, since the last packet in the IP flow is seen.

vi). Enables pre-emptive push of policies for devices in the network. If there is a pattern of communication between two IPEs (in an example, between the source device 110 and the destination device 118, the source device 110 and the destination device 128, or the source device 110 and the destination device (not shown in FIGS. 2A-2C) hosted behind EP (not shown in FIGS. 2A-2C)) in the network, at a certain time period in a day, push policies in advanced anticipation, and withdraw the pushed policies, after the expected traffic flows are stale.

The present disclosure provides several other objects and advantages, some of which are discussed below. The present disclosure enables policy on demand (also referred to as Just in Time policy (JITP)). Further, the present disclosure improves policy scale on SDP systems that use hardware TCAM based EPs. Further, since the VE docker is located often close to the EPs, there is no round trip transit and processing at the SDP-C in the cloud. The functionalities offered by VE docker minimizes the policy enforcement latency, preventing any attack surfaces, that may be exposed for a short duration of time, in current SDP systems.

Figure 3A:
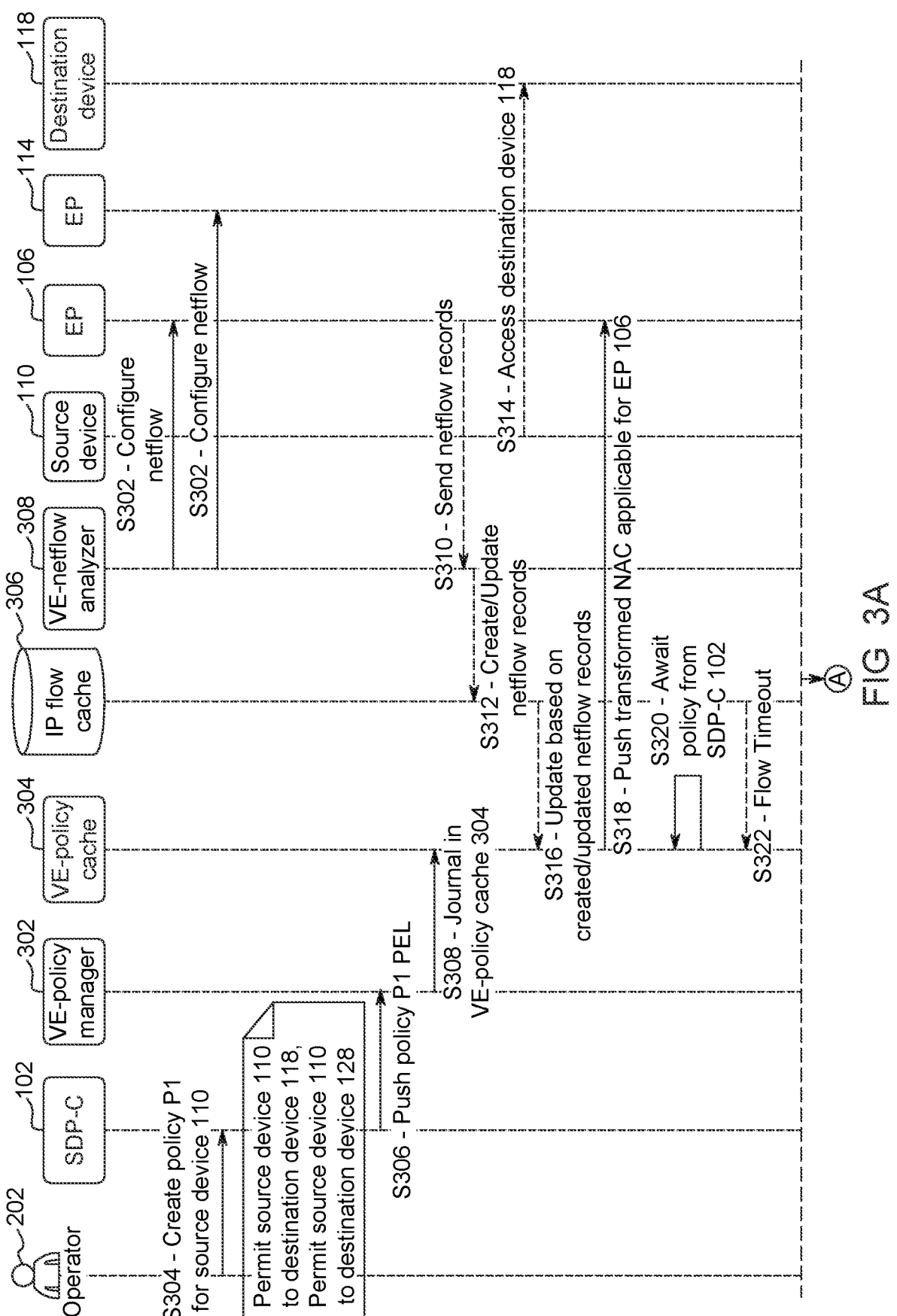
FIGS. 3A-3B illustrate a signal flow diagram to illustrate a method for providing secure communication in a network based on a zero-trust security mechanism and through implementation of TTP-based enforcement, in accordance with some embodiments.
Figure 3B:
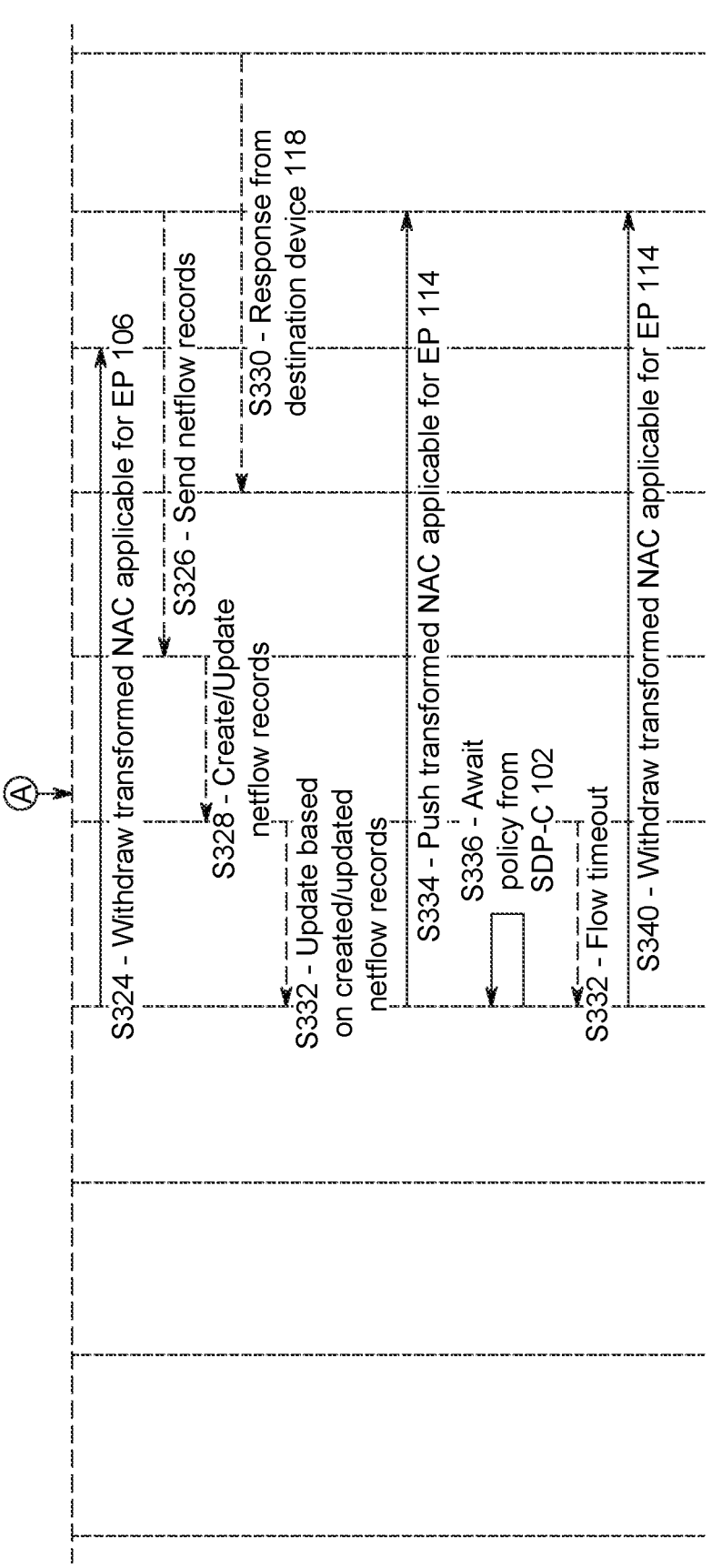

FIGS. 3-3B illustrate a signal flow diagram to illustrate a method for providing secure communication in a network based on a zero-trust security mechanism and through implementation of TTP-based enforcement, in accordance with some embodiments. In order to provide secure communication in a network based on a zero-trust security mechanism and through implementation of TTP-based enforcement, the present disclosure proposes addition of the following entities to a VE docker (in an example, VE docker 108): a VE-policy cache (in an example, a VE-policy cache 304); a VE-netflow analyzer (in an example, a VE-netflow analyzer 308), and a VE-policy manager (in an example, a VE-policy manager 302) that receives a PEL from an SDP-C (in an example, SDP-C 102) and interfaces with VE-policy cache 304.

In an embodiment, VE-netflow analyzer 308 is responsible for netflow configuration of all EPs (including EPs 106, 114, and 124, and any other EP in network 100) controlled by VE docker 108. In response to a detection of traffic (in an example, IP flows) associated with a source device, EPs stream netflow records (associated with the detected traffic) to VE docker 108. Then, VE-netflow analyzer 308 decodes these netflow records, and updates a cache of IP tuples, which is also called the IP flow cache (IPFC). The IPFC may include the flow-tuple {SourceIP, DestinationIP, SourcePort, DestinationPort, IPProtocol, EP-IP (enforcement point's IP), flowcreation Time}.

Further, VE-policy cache 304 is a repository of the policies that are pushed by SDP-C 102 onto an EP (in an example, EP 106) in proximity to a source device (in an example, the source device 110). VE-policy cache 304 serves as a staging area, where policies are cached. These policies are flushed to corresponding EPs, when a new IP flow, that matches a source policy-classifier (i.e., the SourceIP) and destination policy-classifier (i.e., the destination IP) is detected at the corresponding EPs.

The signal flow diagram of FIGS. 3A-3B illustrates a scenario, where policy (in an example, policy (P1)) in the SDP system is setup to allow the source device 110 (in an example, a laptop referred to as IPE1) that intends to connect to an access port on EP 106, to access the destination device 118 located on EP 114, and the destination device 128 located on EP 124. Before step S302 of FIG. 3A (in the illustrated case scenario of FIGS. 3A-3B), it is assumed that the destination device 118 and the destination device 128 are onboarded (an example on how the destinations devices 118 and 128 are onboarded is explained in the description of FIGS. 2A-2C).

In step S302 of FIG. 3A, VE-netflow analyzer 308 may configure netflows (as discussed above) for EPs 106 and 114 controlled by VE docker 108. Next, in step S304 of FIG. 3A, operator 202 may create the policy (P1) for the source device 110. In an embodiment, the policy (P1) may include but is not limited to: permitting the source device 110 to access at least one application, service, or functionality on the destination device 118, and permitting the source device 110 to access at least one application, service, or functionality on the destination device 128.

Then, in step S306 of FIG. 3A, the created policy (P1) may be pushed to VE-policy manager 302 from SDP-C 102. The received policy may be in the form of a PEL. Subsequently, in step S308, the policy (P1) may be transmitted to (journaled into) VE-policy cache 304 such that the policy is stored in there (in VE-policy cache 304).

Next, in step S310 of FIG. 3A, when the source device 110 tries to access any destination device, one or more IP flows may be generated. The one or more IP flows are metered as netflow records on EP 106, and may be sent to VE-netflow analyzer 308. Subsequently, in step S312 of FIG. 3A, VE-netflow analyzer 308 may create or update the netflow records including the flow-tuple {SourceIP, DestinationIP, SourcePort, DestinationPort, IPProtocol, EP-IP (enforcement point's IP), flowcreationTime} in the IP flow cache 306 and may notify VE-policy cache 304.

Then, in step S314 of FIG. 3A, when the source device 110 tries to access at least one application or service or functionality of the destination device 118, one or more IP flows may be generated. These one or more IP flows are metered as netflow records are collected and analyzed by the VE-netflow analyzer 308 (this step being similar to step S310 described above). The VE-netflow analyzer 308 may update the netflow records including the flow tuples in step S316 of FIG. 3A in the VE-policy cache 304 by using IP flow cache 306. Updating the flow tuples in step S316 may be based on the one or more IP flows that are metered when the source device 110 tries to access at least one application or service or functionality of the destination device 118.

Further, in step S318 of FIG. 3A, VE-policy cache 304 may perform a policy lookup (in policy (P1)), for the flow-tuple {SourceIP, DestinationIP, SourcePort, DestinationPort, IPProtocol, EP-IP (enforcement point's IP), flowcreationTime}, and based on the policy lookup, VE-policy cache 304 may then push a transformed NAC (including transformed NAC constructs) to EP 106. In an example, VE-policy cache 304 may push the transformed NAC to EP 106 if a policy for the flow-tuple exists in one or more databases of VE docker 108.

Next, in step S320 of FIG. 3A, VE-policy cache 304 may await for any further policy additions, deletions, or modifications from SDP-C 102 (via VE-policy manager 302). While doing so, if VE-policy cache 304, in step S322 of FIG.

3A, receives an IP flow timeout from the IP flow cache 306, VE-policy cache 304, in step S324 of FIG. 3B, may withdraw the transformed NAC applicable for EP 106.

Next, in step S326 of FIG. 3B, when traffic (in an example, one or more IP flows) is sent by the destination device 118 (located on EP 114) to the source device 110, the one or more IP flows may be metered as netflow records on EP 114, and sent to VE-netflow analyzer 308. Subsequently, in step S328 of FIG. 3B, VE-netflow analyzer 308 may create or update the netflow records including the flow-tuple {SourceIP, DestinationIP, SourcePort, DestinationPort, IPProtocol, EP-IP (enforcement point's IP), flowcreation-Time} in the IP flow cache 306, and notify VE-policy cache 304.

Then, in step S330 of FIG. 3B, the source device 110 may receive a response (including one or more IP flows) from the destination device 118. Next, in step S332 of FIG. 3B, the IP flow cache 306 may provide updates to VE-policy cache 304 based on the created/updated netflow records (associated with step S328).

Further, in step S334 of FIG. 3B, VE-policy cache 304 may perform a policy lookup, for the flow-tuple {SourceIP, DestinationIP, SourcePort, DestinationPort, IPProtocol, EP-IP (enforcement point's IP), flowcreationTime}, and based on the policy lookup, VE-policy cache 304 may push a transformed NAC (including transformed NAC constructs) to EP 114. In an example, VE-policy cache 304 may push the transformed NAC to EP 114 if a policy for the flow-tuple exists in one or more databases of VE docker 108.

Next, in step S336 of FIG. 3B, VE-policy cache 304 may await for any further policy additions, deletions, or modifications from SDP-C 102 (via VE-policy manager 302). While doing so, if VE-policy cache 304, in step S338 of FIG. 3B, receives an IP flow timeout from the IP flow cache 306, VE-policy cache 304, in step S340 of FIG. 3B, may withdraw the transformed NAC applicable for EP 114.

The traffic path between the source device 110 and the destination device 118 is set-up once all the steps described in FIGS. 3A-3B are executed. In this scenario, hardware resources are not consumed on EP 124, which hosts destination device 128, even though the policy (P1), specifies a policy for the destination device 128. The policy corresponding to the destination device 128 will be applied on demand, whenever the source device 110 makes an attempt to access the destination device 128.

The IP flow cache 306 also has the functionality of timing out a flow-tuple, when it obtains an inactive netflow record, for that tuple. VE-policy cache 304 will then delete or withdraw the NAC constructs from the EPs. This leads to conserving the TCAM resources on the EPs which ultimately results in the scalability of the securing approach while minimal latency.

Thus, embodiments of the present disclosure offer low latency for policy application, and conserve hardware resource thus improving the scale for securing networks. A further objective of the present disclosure may be achieved by having a new attribute (in an example, "always-flush") in a PEL to program transformed NAC constructs, irrespective of the traffic trigger. The transformed PEL may help in scenarios to program the policies, if a well-known traffic (in an example, IP flow(s)) pattern is known. For example, one such executed scenario may be: Always program a policy between an accounting application and a server, for offline transaction processing at 6 PM every Sunday. This programmed policy could be a scheduled time-based policy.

Figure 4A:
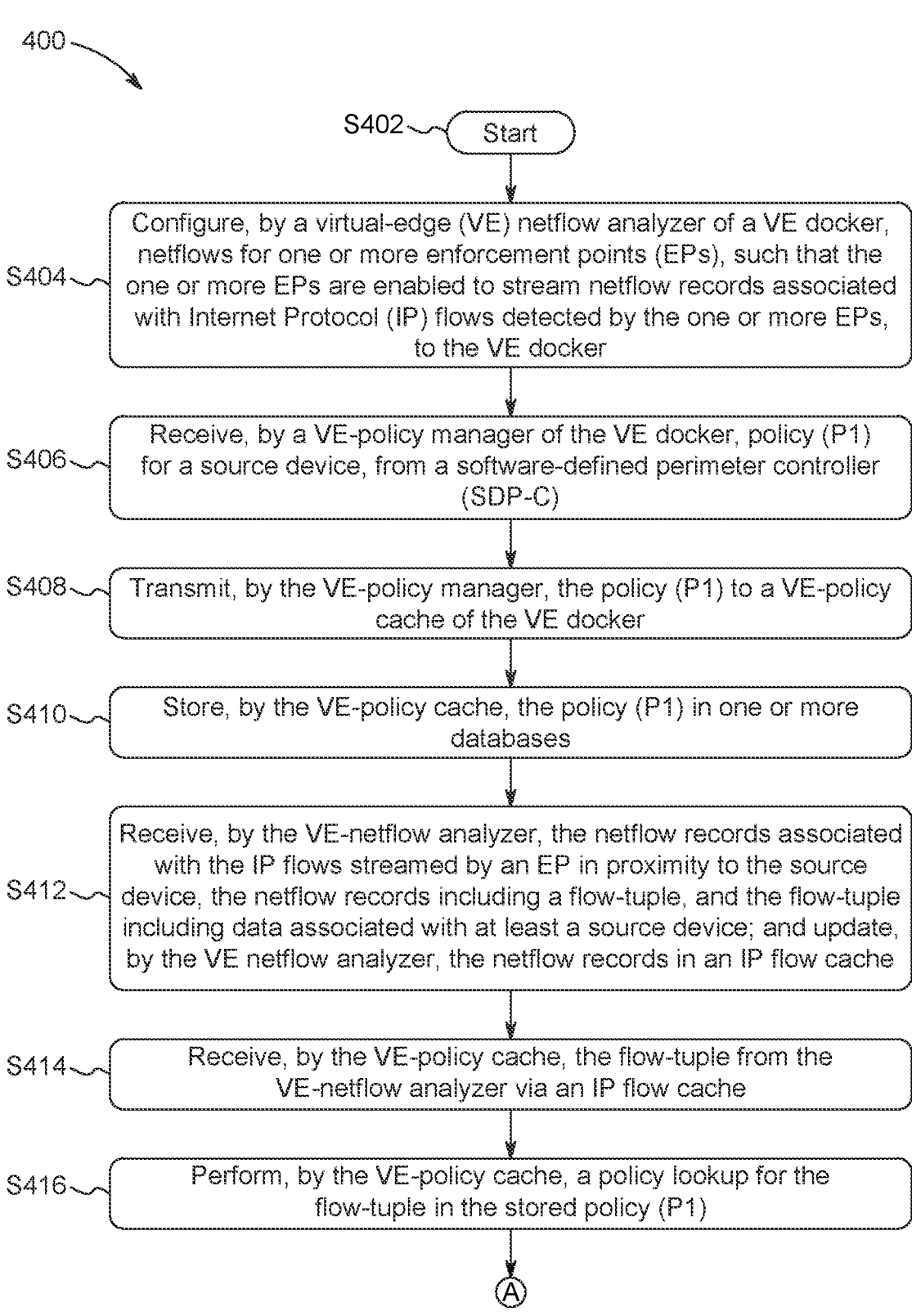
Figure 4C:
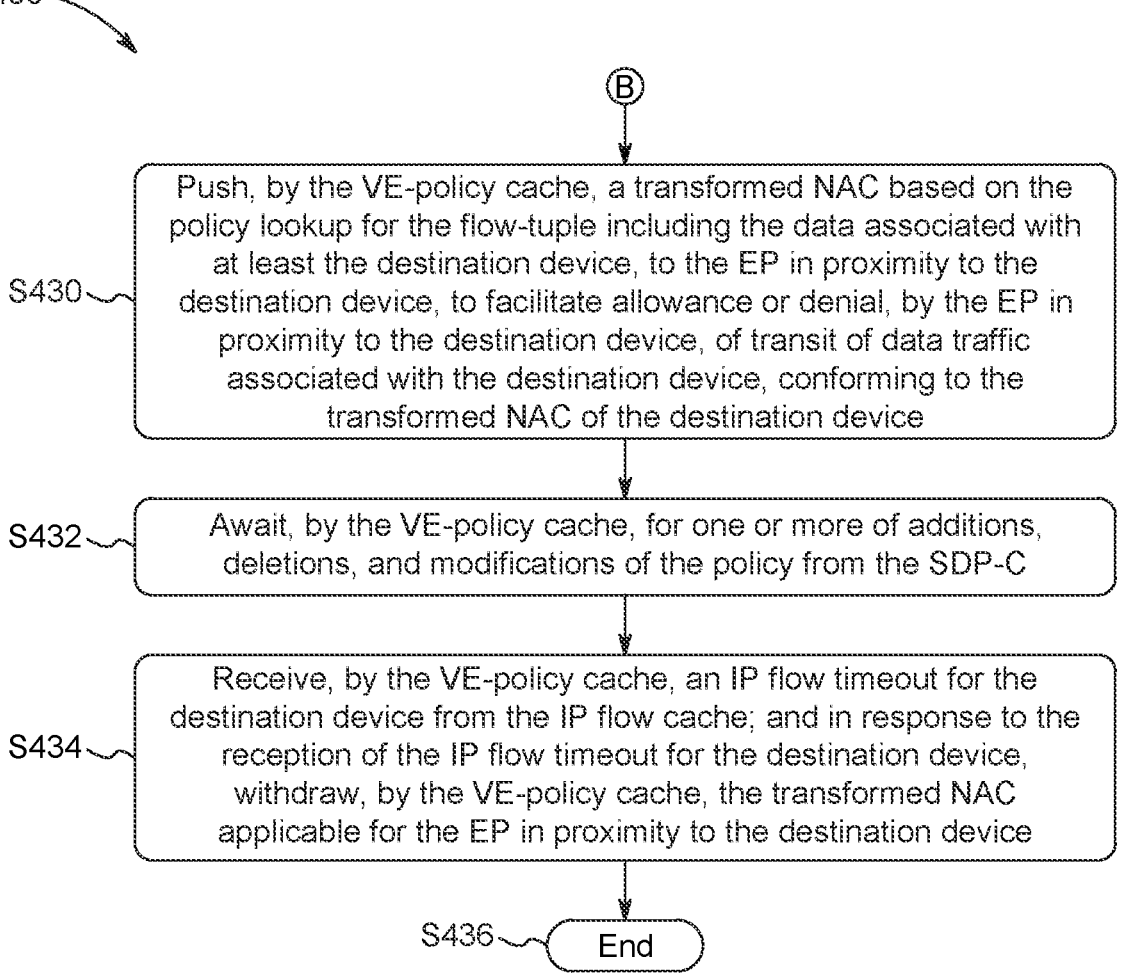

FIGS. 4A-4C illustrate a flowchart illustrating the steps (of a method 400) involved in securing a network using TTP-based enforcement, in accordance with some embodiments. In an embodiment, one or more steps of method 400 may be performed by one or more entities included in a VE docker (in an example, VE docker 108). In an embodiment, one or more entities of VE docker 108 may perform the corresponding one or more functionalities as described by means of the signal flow diagram of FIGS. 3A-3B. In an embodiment, VE docker 108 may include entities, that are not limited to, VE-policy manager 302, VE-policy cache 304, and VE-netflow analyzer 308.

The method 400 starts with step S402 of FIG. 4A. Then, at step S404 of FIG. 4A, VE-netflow analyzer 308 of VE docker 108 may configure netflows for one or more EPs (in an example, EPs 106 and 114), such that the one or more EPs are enabled to stream netflow records associated with IP flows detected by the one or more EPs, to VE docker 108. In the next step, i.e., at step S406 of FIG. 4A, VE-policy manager 302 may receive policy (P1) for the source device 110, from SDP-C 102. Subsequently, at step S408 of FIG. 4A, VE-policy manager 302 may transmit the policy (P1) to VE-policy cache 304.

Then, at step S410 of FIG. 4A, VE-policy cache 304 may store the policy (P1) in one or more databases included in VE-docker 108. At step S412 of FIG. 4A, VE-netflow analyser 308 may receive the netflow records associated with the IP flows streamed by the closest EP (in an example, EP 106) to the source device 110. The net flow records may include a flow-tuple, which may in turn include {SourceIP, DestinationIP, SourcePort, DestinationPort, IPProtocol, EP-IP (enforcement point's IP), flowcreationTime}. Further, at step S412 of FIG. 4A, the VE-netflow analyser 308 may insert or update this flow-tuple into the IP flow cache 306.

Next, at step S414 of FIG. 4A, VE-policy cache 304 may receive the flow-tuple from VE-netflow analyzer 308 of VE docker 108 via IP flow cache 306. Subsequently, VE-policy cache 304, in step S416 of FIG. 4A, may perform a policy lookup for the flow-tuple in the stored policy (P1). In an embodiment, VE-policy cache 304 may check if a policy for the flow-tuple exists in the one or more databases. Further, in step S418 of FIG. 4B, VE-policy cache 304 may push a transformed NAC (including transformed NAC constructs) based on the policy lookup, to EP 106 that is located in proximity to the source device 110, to facilitate allowance or denial, by EP 106, of transit of data traffic (in an example, one or more IP flows) associated with the source device 110, conforming to the transformed NAC. In an embodiment, the transformed NAC is pushed if the policy for the flow-tuple exists in the one or more databases.

In the next step, i.e., at step S420 of FIG. 4B, VE-policy cache 304 may await for one or more of additions, deletions, and modifications of the policy (P1) from SDP-C 102. Subsequently, VE-policy cache 304, in step S422 of FIG. 4B, may receive an IP flow timeout from IP flow cache 306; and in response to receiving the IP flow timeout, withdraw the transformed NAC applicable for the EP in proximity to the source device (in an example, EP 106). Further, in step S424 of FIG. 4B, VE-netflow analyzer 308 may receive the netflow records associated with the IP flows streamed by an EP in proximity to the destination device 118 (in an example, EP 114) of the network, the netflow records including a flow-tuple associated with at least the destination device 118. Further, in step S424 of FIG. 4B, the flow-tuple is updated in IP flow cache 306.

Subsequently, in step S426 of FIG. 4B, VE-policy cache 304 may receive the flow-tuple including the data associated with at least the destination device 118, from VE-netflow analyzer 308 via IP flow cache 306. Further, in step S428 of FIG. 4B, the VE-policy cache 304 may perform a policy lookup for the flow-tuple including the data associated with at least the destination device 118 in the policy (P1). Subsequently, in step S430 of FIG. 4C, VE-policy cache 304 may push a transformed NAC based on the policy lookup for the flow-tuple including the data associated with at least the destination device 118, to the EP in proximity to the destination device 118, to facilitate allowance or denial, by the EP in proximity to the destination device 118, of transit of data traffic (in an example, one or more IP flows) associated with the destination device 118, conforming to the transformed NAC of the destination device 118.

Further, in step S432 of FIG. 4C, VE-policy cache 304 may await for one or more of additions, deletions, and modifications of the policy (P1) from SDP-C 102. In the next step, i.e., in step S434 of FIG. 4C, VE-policy cache 304 may receive an IP flow timeout for the destination device 118 from IP flow cache 306; and in response to the reception of the IP flow timeout for the destination device 118, withdraw the transformed NAC applicable for the EP in proximity to the destination device 118. Further, the method 400 ends with step S436 of FIG. 4C.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Further, the present disclosure proposes a device for traffic triggered, policy-based enforcement included in network 100 or any other device/entity described in FIGS. 2 and 3. The device may at least include a processor and a memory. The memory may include computer-executable instructions, which when executed, cause the processor to perform the steps described in the context of FIGS. 2-3 and 4A-4C.

In view of the above description, the embodiments presented herein implement traffic triggered, policy-based enforcement through the usage of just in time policies (as described above). The disclosed SDP system leads to low latency for policy application, and conserves hardware resource(s) thus improving policy scale in secure communication networks. In the conventional network security mechanisms, a solution that enables the above aspects, does not exist.

In an embodiment, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), readonly memory (ROM), volatile memory, nonvolatile memory, hard drives, CD ROMs, DVDs, flash drives, disks, and any other known physical storage media.

The terms "comprising," "including," and "having," as used in the claim and specification herein, shall be considered as indicating an open group that may include other elements not specified. The terms "a," "an," and the singular forms of words shall be taken to include the plural form of the same words, such that the terms mean that one or more of something is provided. The term "one" or "single" may be used to indicate that one and only one of something is intended. Similarly, other specific integer values, such as "two," may be used when a specific number of things is intended. The terms "preferably," "preferred," "prefer," "optionally," "may," and similar terms are used to indicate that an item, condition, or step being referred to is an optional (not required) feature of the invention.

The invention has been described with reference to various specific and preferred embodiments and techniques. However, it should be understood that many variations and modifications may be made while remaining within the spirit and scope of the invention. It will be apparent to one of ordinary skill in the art that methods, devices, device elements, materials, procedures, and techniques other than those specifically described herein can be applied to the practice of the invention as broadly disclosed herein without resort to undue experimentation. All art-known functional equivalents of methods, devices, device elements, materials, procedures, and techniques described herein are intended to be encompassed by this invention. Whenever a range is disclosed, all subranges and individual values are intended to be encompassed. This invention is not to be limited by the embodiments disclosed, including any shown in the drawings or exemplified in the specification, which are given by way of example and not of limitation. Additionally, it should be understood that the various embodiments of the networks, devices, and/or modules described herein contain optional features that can be individually or together applied to any other embodiment shown or contemplated here to be mixed and matched with the features of such networks, devices, and/or modules.

While the invention has been described with respect to a limited number of embodiments, those skilled in the art, having benefit of this disclosure, will appreciate that other embodiments can be devised which do not depart from the scope of the invention as disclosed herein.

We claim:

1. A method for securing a network, the method comprising:
  receiving, by a virtual-edge (VE) docker of the network, a flow-tuple including data associated with at least a source device of the network, from an Internet Protocol (IP) flow cache;
  performing, by the VE docker, a policy lookup for the flow-tuple in one or more policy databases for the source device; and
  pushing, by the VE docker, a transformed network access control (NAC) including NAC constructs based on the policy lookup, to an enforcement point (EP) in proximity to the source device.

2. The method of claim 1, further comprising receiving, by the VE docker, a policy from a software-defined perimeter controller (SDP-C).

3. The method of claim 2, further comprising storing, by the VE docker, the policy in the one or more policy databases included in the VE docker.

4. The method of claim 3, wherein performing the policy lookup for the flow-tuple in the policy comprises determining whether a policy for the flow-tuple exists in the one or more policy databases.

5. The method of claim 4, wherein pushing the transformed NAC to the EP in priority to the source device comprises pushing the transformed NAC to the EP in proximity to the source device in response to determining that the policy for the flow-tuple exists in the one or more policy databases.

6. The method of claim 1, further comprising:
  configuring, by the VE docker, netflows for one or more EPs, including the EP in proximity to the source device and controlled by the VE docker in the network, such that the one or more EPs are enabled to stream netflow records associated with IP flows detected by the one or more EPs, to the VE docker.

7. The method of claim 6, further comprising:
  receiving, by the VE docker, the netflow records associated with the IP flows streamed by the EP in proximity to the source device, wherein the netflow records include the flow-tuple.

8. The method of claim 7, further comprising:
  updating, by the VE docker, the netflow records in the IP flow cache.

9. The method of claim 8, further comprising:
  awaiting, by the VE docker, for one or more of additions, deletions, and modifications of the policy from a software-defined perimeter controller (SDP-C).

10. The method of claim 9, further comprising:
  receiving, by the VE docker, an IP flow timeout from the IP flow cache; and
  in response to receiving the IP flow timeout, withdrawing, by the VE docker, the transformed NAC applicable for the EP in proximity to the source device.

11. The method of claim 6, further comprising:
  receiving, by the VE docker, the netflow records associated with the IP flows streamed by an EP in proximity to a destination device of the network, wherein the netflow records include a flow-tuple including data associated with at least the destination device.

12. The method of claim 11, further comprising:
  updating, by the VE docker, the netflow records associated with the IP flows streamed by the EP in proximity to the destination device, in the IP flow cache.

13. The method of claim 12, further comprising:
  receiving, by the VE docker, the flow-tuple including the data associated with at least the destination device, from the IP flow cache;
  performing, by the VE docker, a policy lookup for the flow-tuple including the data associated with at least the destination device in the one or more policy databases; and
  pushing, by the VE docker, a transformed NAC based on the policy lookup for the flow-tuple including the data associated with at least the destination device, to the EP in proximity to the destination device.

14. The method of claim 13, further comprising:
  awaiting, by the VE docker, for one or more of additions, deletions, and modifications of a policy from a software-defined perimeter controller (SDP-C).

15. The method of claim 14, further comprising:
  receiving, by the VE docker, an IP flow timeout for the destination device from the IP flow cache; and in response to receiving the IP flow timeout for the destination device, withdrawing, by the VE docker, the transformed NAC applicable for the EP in proximity to the destination device.

16. A virtual-edge (VE) docker for securing a network, the VE docker comprising:

a processor; and a memory storing computer-executable instructions that when executed, cause the processor to:

receive, a flow-tuple including data associated with at least a source device of the network, from an Internet Protocol (IP) flow cache;

perform a policy lookup for the flow-tuple in one or more policy databases for the source device; and push a transformed network access control (NAC) including NAC constructs based on the policy lookup, to an enforcement point (EP) in proximity to the source device.

17. The VE docker of claim 16, wherein the processor is further configured to:

configure netflows for one or more EPs, including the EP in proximity to the source device and controlled by the VE docker in the network, such that the one or more EPs are enabled to stream netflow records associated with IP flows detected by the one or more EPs, to the VE docker; and receive the netflow records associated with the IP flows streamed by the EP in proximity to the source device, wherein the netflow records include the flow-tuple.

18. The VE docker of claim 17, wherein the processor is further configured to:

update the netflow records in the IP flow cache.

19. The VE docker of claim 18, wherein the processor is further configured to:

await for one or more of additions, deletions, and modifications of a policy from a software-defined perimeter controller (SDP-C).

20. The VE docker of claim 19, wherein the processor is further configured to:

receive an IP flow timeout from the IP flow cache; and in response to the reception of the IP flow timeout, withdraw the transformed NAC applicable for the EP in proximity to the source device.

* * * * *